(12) United States Patent
Muroi et al.

(10) Patent No.: US 7,679,303 B2
(45) Date of Patent: Mar. 16, 2010

(54) EVALUATION DEVICE AND METHOD FOR ROTARY DRIVE, CORRECTIVE MANIPULATED VARIABLE SETTING DEVICE AND METHOD, CONTROL DEVICE AND METHOD, AND PROGRAM

(75) Inventors: Kazushige Muroi, Nagoya (JP); Kohei Terada, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1204 days.

(21) Appl. No.: 11/236,556

(22) Filed: Sep. 28, 2005

(65) Prior Publication Data

US 2006/0076920 A1 Apr. 13, 2006

(30) Foreign Application Priority Data

Sep. 30, 2004 (JP) ............................. 2004-289139

(51) Int. Cl.
*H02K 23/00* (2006.01)
*H02K 37/00* (2006.01)
(52) U.S. Cl. ............. 318/437; 318/400.03; 318/400.14; 318/632; 318/461
(58) Field of Classification Search ................ 318/437, 318/400.03, 400.14, 461, 632
See application file for complete search history.

(56) References Cited

U.S. PATENT DOCUMENTS 5,557,184 A * 9/1996 Hwang ........................ 318/608
6,822,417 B2 * 11/2004 Kawaji et al. ............... 318/701
6,856,035 B2 * 2/2005 Brandon et al. ........... 290/40 C
6,988,570 B2 * 1/2006 Takeuchi .................... 180/6.48

FOREIGN PATENT DOCUMENTS

| JP | 58-066589 A | 4/1983 |
|----|-------------|--------|
| JP | 6225580 | 8/1994 |
| JP | 11018475 | 1/1999 |
| JP | 2000-184763 A | 6/2000 |

* cited by examiner

*Primary Examiner*—Bentsu Ro
*Assistant Examiner*—Erick Glass
(74) *Attorney, Agent, or Firm*—Banner & Witcoff, Ltd.

(57) ABSTRACT

An evaluation device for a rotary drive that evaluates periodic velocity fluctuation of the rotary drive is provided. The evaluation device includes a rotational velocity fluctuation detector, a reference signal generator, and a multiplier-accumulator. The rotational velocity fluctuation detector detects rotational velocity fluctuation relative to a reference velocity of the rotary drive. The reference signal generator generates a reference signal, in which the reference signal has a period and a phase angle. The multiplier-accumulator performs a multiply-accumulate operation between the rotational velocity fluctuation detected by the rotational velocity fluctuation detector and the reference signal generated by the reference signal generator, so as to detect a fluctuation intensity at the phase angle of a component having the period, in which the component is included in the rotational velocity fluctuation detected by the rotational velocity fluctuation detector.

45 Claims, 6 Drawing Sheets

EVALUATION DEVICE AND METHOD FOR ROTARY DRIVE, CORRECTIVE MANIPULATED VARIABLE SETTING DEVICE AND METHOD, CONTROL DEVICE AND METHOD, AND PROGRAM

CROSS-REFERENCE TO RELATED APPLICATIONS

This application claims the benefit of Japanese Patent Application No. 2004-289139 filed Sep. 30, 2004 in the Japan Patent Office, the disclosure of which is incorporated herein by reference.

BACKGROUND

This invention relates to a device and method for evaluation of periodic velocity fluctuation (particularly, the phase angle and amplitude thereof) in a rotary drive such as a direct-current (DC) motor, a device and method ,for setting a corrective manipulated variable appropriate for the control of the periodic velocity fluctuation of the rotary drive based on a result of the evaluation, a control device and method for using the set corrective manipulated variable to control the drive of the rotary drive, and a program for executing the evaluation of the periodic velocity fluctuation of the rotary drive in a computer.

Heretofore, an ink jet printer has been provided with a carriage mounting a recording head thereon and capable of being moved to and fro along a guide shaft. Such a carriage is driven by a DC motor.

In a DC motor, even if the driving current or driving voltage is constant, the torque during one rotation of a motor shaft is not uniform because of structural reasons of the DC motor. Periodic torque fluctuation, so-called cogging, occurs. Accordingly, the rotational velocity of the DC motor is periodically fluctuated. As a result, the moving velocity of the carriage being moved to and fro by the rotation of the DC motor is fluctuated as well.

As the moving velocity goes up, the ink ejected from the recording head during such a movement appears to be thin (light-colored), since the ink is ejected with a relatively lower density of placement on a recording medium. To the contrary, when the moving velocity of the carriage goes down, the ink ejected from the recording head appears to be thick (dark-colored), since the ink is ejected with a relatively higher density of placement on a recording medium.

In other words, when the moving velocity of the carriage is fluctuated along with the fluctuation in the rotational velocity of the DC motor, a light-colored area and a dark-colored area alternately appear and produce a striped pattern on the recording medium, even though the overall area should be recorded with a relatively constant density.

In order to avoid the above problem, periodic signals having the same period as the period of cogging, but having the opposite phase, are superimposed on the drive signal of the DC motor. This generates a torque having an opposite phase to the cogging torque in the motor and cancels the periodic velocity fluctuation of the DC motor.

Since it is necessary to generate a signal having a phase opposite to the rotational velocity fluctuation to be canceled for the cancellation of the periodic velocity fluctuation of the DC motor, the following technique has been proposed for example. That is, firstly, in synchronization with the rotation of the DC motor, a predetermined number of pulses are generated in one rotation of the DC motor. The period of each pulse is measured to be compared with a reference period when the motor is rotated at a predetermined rotational velocity, so as to obtain rotational velocity error data per pulse period. Further, each rotational velocity error data is averaged with rotational velocity error data for the previous rotation so as to obtain average rotational velocity error data per pulse period. Based on the pulse having the maximum error data from among the respective average rotational velocity error data, the phase of the signal (sine wave) to be added to the driving signal is set.

However, in the above proposed technique, a plurality of average rotational velocity error data are obtained per one rotation of the DC motor. Then, from the obtained error data, the phase of the rotational velocity fluctuation of the DC motor is specified to set the phase of a signal for rotational fluctuation cancellation to be added to the driving signal. Therefore, it is possible to set a sine-wave phase for controlling the velocity fluctuation in the case in which one rotation of the DC motor corresponds to one period. However, for example, it is not possible to specify the phase of the periodic velocity fluctuation generated by the load connected to the motor shaft of the DC motor, such as a belt or pulley connected to the motor shaft to move the carriage (i.e., periodic velocity fluctuation generated by the rotation of the belt or pulley). That is, it is not possible to control a periodic velocity fluctuation that does not synchronize with a rotation of the DC motor.

SUMMARY

One aspect of the present invention may provide an evaluation device and method that allows accurate evaluation of not only periodic velocity fluctuation generated in synchronization with a rotation of a rotary drive such as a DC motor, but also periodic velocity fluctuation generated by a load connected to a driving shaft of the rotary drive. Another aspect of the present invention may provide a corrective manipulated variable setting device and method that allows the setting of a corrective manipulated variable appropriate for controlling the periodic velocity fluctuation of the rotary drive based on results of the evaluation. A further aspect of the present invention may provide a control device and method that uses the set corrective manipulated variable to allow optimal drive and control of the rotary drive. A still further aspect of the present invention may provide a program that executes the evaluation of the periodic velocity fluctuation of the rotary drive in a computer.

One aspect of the present invention provides an evaluation device that evaluates periodic velocity fluctuation of a rotary drive. The evaluation device includes: a rotational velocity fluctuation detector that detects rotational velocity fluctuation relative to a reference velocity of the rotary drive; a reference signal generator that generates a reference signal, in which the reference signal has a period and a phase angle; and a multiplier-accumulator that performs a multiply-accumulate operation between the rotational velocity fluctuation detected by the rotational velocity fluctuation detector and the reference signal generated by the reference signal generator, so as to detect a fluctuation intensity at the phase angle of a component having the period, in which the component is included in the rotational velocity fluctuation detected by the rotational velocity fluctuation detector.

Another aspect of the present invention provides a corrective manipulated variable setting device that sets a corrective manipulated variable used to control periodic velocity fluctuation of a rotary drive in a control device of the rotary drive. The corrective manipulated variable setting device includes: the aforementioned evaluation device for a rotary drive; and a corrective manipulated variable setting unit that, based on a phase angle or amplitude of a component having a specific period, in which the phase angle or the amplitude is estimated by the phase angle estimator or the amplitude estimator inside of the evaluation device, sets a periodic corrective manipulated variable for canceling the rotational velocity fluctuation having the phase angle or the amplitude.

Further, another aspect of the present invention also provides a corrective manipulated variable setting device that sets a corrective manipulated variable used to control the periodic, velocity fluctuation of a rotary drive in the control device of the rotary drive. The corrective manipulated variable setting device includes: a driving unit that corrects a manipulated variable of the rotary drive, using each of a plurality of periodic corrective manipulated variables in which at least one of phase angle and amplitude is respectively different from each other, and sequentially drives the rotary drive using each of a plurality of corrected manipulated variables formed by the correction; a rotational velocity fluctuation detector that detects rotational velocity fluctuation relative to a reference velocity of the rotary drive every time the driving unit drives the rotary drive using the respective manipulated variables; a reference signal generator that generates a plurality of reference signals having a predetermined period, in which the plurality of the reference signals are different in phase angle from each other; a multiplier-accumulator that performs a multiply-accumulate operation between the rotational velocity fluctuation per each manipulated variable detected in the rotational velocity fluctuation detector and each of the reference signals generated in the reference signal generator, respectively; an amplitude estimator that, based on results of operation by the multiplier-accumulator, respectively estimates the amplitude of a component having the predetermined period, in which the component is included in the rotational velocity fluctuation generated when the driving unit drives the rotary drive by each manipulated variable; and a corrective manipulated variable setting unit that sets a corrective manipulated variable, which is used to generate the manipulated variable of the rotary drive and corresponds to the smallest amplitude estimated by the amplitude estimator, as a corrective manipulated variable suitable for controlling the periodic velocity fluctuation of the rotary drive.

Still further, another aspect of the present invention provides a control device including: a corrective manipulated variable setting unit that sets a corrective manipulated variable necessary for controlling the periodic velocity fluctuation of a rotary drive; and a manipulated variable corrector that corrects a manipulated variable necessary for driving the rotary drive at a target rotational velocity by the corrective manipulated variable set in the corrective manipulated variable setting unit. The control device drives the rotary drive according to a corrected manipulated variable formed in the manipulated variable corrector. The above described corrective manipulated variable setting device is provided as the corrective manipulated variable setting unit of the control device.

Still another aspect of the present invention provides a program that allows a computer to be implemented with the functions of the aforementioned evaluation device for a rotary drive.

The program, which includes an ordered sequence of instructions suitable for processing by a computer, may be provided to a computer or a user who uses the computer through a recording medium such as an FD, a CD-ROM and a memory card, or a communication line network such as the Internet. When provided to a user, the program may be pre-installed in a hard disk or a memory of the computer. The computer to execute the program may be a computer installed in an evaluation device, or may be a separate computer capable of data communication with the evaluation device.

BRIEF DESCRIPTION OF THE DRAWINGS

The invention will now be described below, by way of example, with reference to the accompanying drawings, in which.

DETAILED DESCRIPTION OF THE PREFERRED EMBODIMENT

Figure 1:
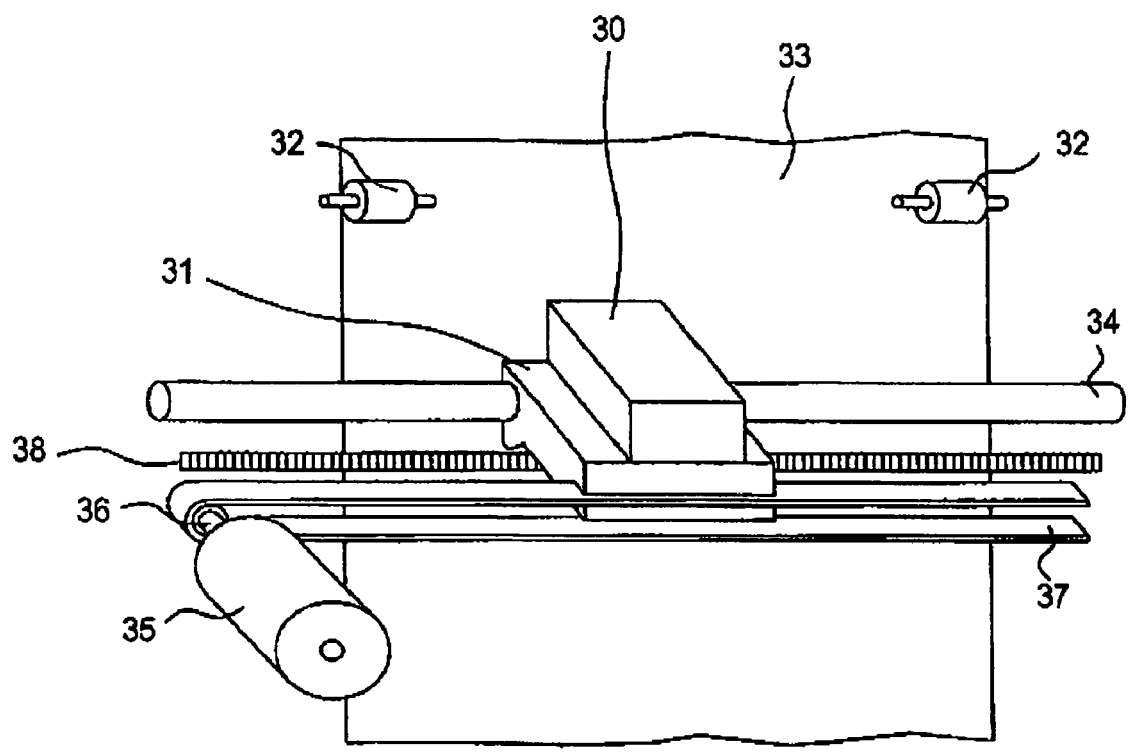
FIG. 1 is a schematic structural view of a carriage drive mechanism as a component of a printer according to an embodiment of the present invention.

Referring to FIG. 1, an ink jet printer (hereafter, referred to as a "printer") comprises a carriage drive mechanism according to the present invention. In this carriage drive mechanism, a recording head 30 is mounted on a carriage 31, and hold rollers 32 convey a recording sheet 33. The recording head 30 performs recording by ejecting ink toward the recording sheet 33 from a nozzle. A guide shaft 34, provided in a width direction of the recording sheet 33, is passed through the carriage 31.

A carriage motor (hereafter, referred to as a CR motor) 35 is provided on one end of the guide shaft 34. Between a pulley 36 of the CR motor 35 and an idle pulley (not shown) provided on the other end of the guide shaft 34, an endless belt 37 is held along the guide shaft 34. The carriage 31 is connected to the endless belt 37.

That is, the carriage 31 is designed to move back and forth in a width direction of the recording sheet 33 along the guide shaft 34 by the driving force of the CR motor 35 transmitted via the endless belt 37. The CR motor 35 is designed as a direct-current (DC) motor.

A timing slit 38 is provided below and along the guide shaft 34. Slits having a certain interval therebetween are formed on the timing slit 38.

A detector (not shown) is provided in a lower part of the carriage 31. The detector includes a photo interrupter having a light emitting element and a light receiving element that are arranged to face each other. The timing slit 38 is positioned between the light emitting element and the light receiving element. The detector and the timing slit 38 together constitute a later-explained linear encoder 39 (see FIG. 2).

The detector constituting the linear encoder 39 outputs two types of encoder signals, ENC1 and ENC 2. The phase of ENC1 and the phase of ENC2 are shifted by a predetermined cycle (e.g., ¼ cycles). When the carriage 31 is moved in a forward direction, that is, from a home position (the left end position in FIG. 1) to the side of the idle pulley, the phase of ENC1 is advanced ahead of the phase of ENC2 by the predetermined cycle. When the carriage is moved in a reverse direction, that is, from the side of the idle pulley to the home position, the phase of ENC1 is delayed from the phase of ENC2 by the predetermined cycle.

In the above carriage drive mechanism, the carriage 31 is stopped at the home position near a side end of the pulley 36 of the guide shaft 34, or at a predetermined stop position for maintenance, etc. of the recording head 30. When the recording head 30 is operated to start the recording process for forming an image on the recording sheet 33, the carriage 31 is accelerated so as to reach a target driving velocity before arriving at a recording start position from the current stop position. Then, the carriage 31 is moved at the target driving velocity till it reaches a recording termination position. After reaching the recording termination position, the carriage 31 is decelerated until it is stopped at the target stop position.

In order to move the carriage 31 as above, a carriage drive controller is provided in the printer.

Figure 2:
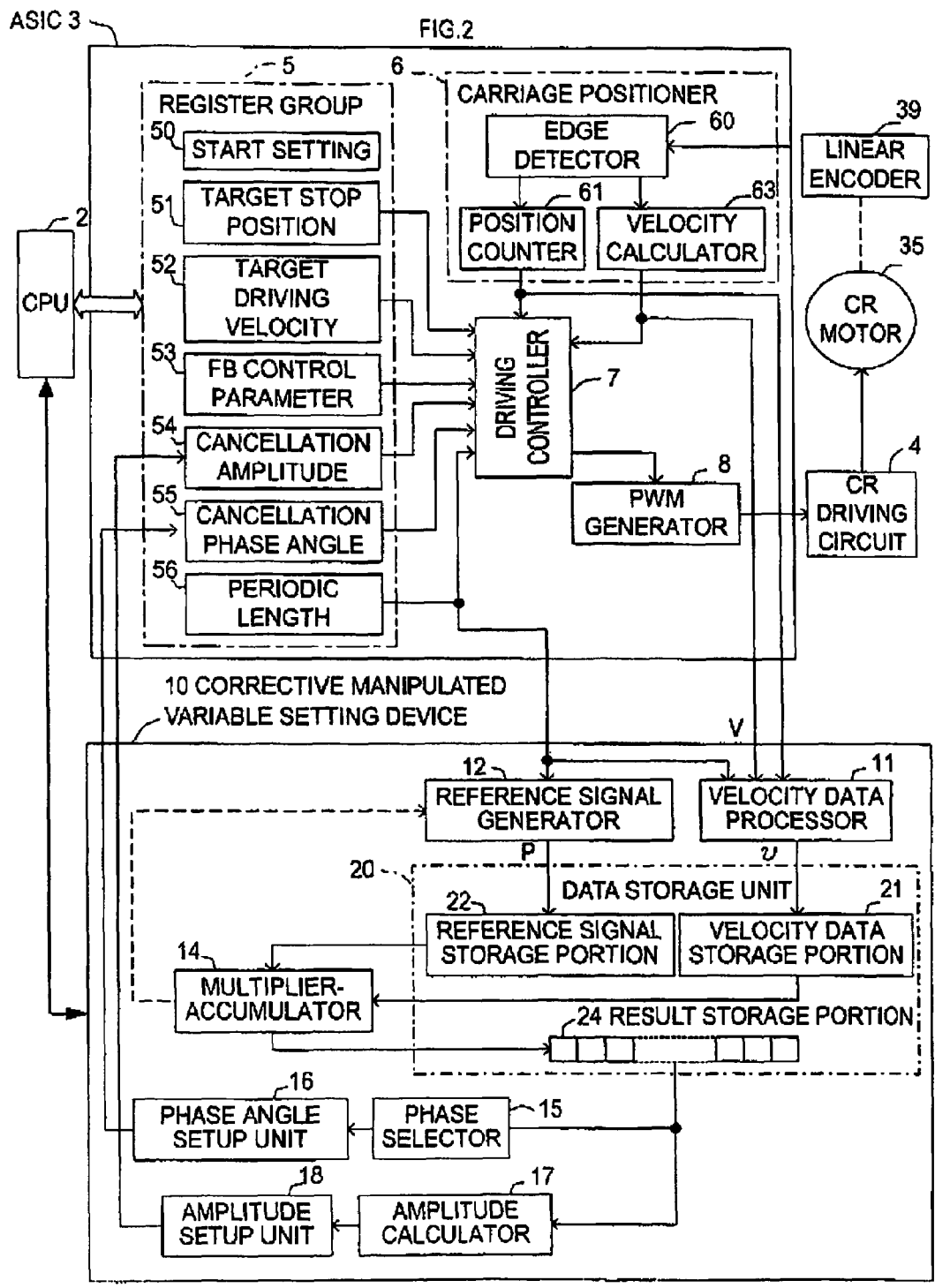
FIG. 2 is a block diagram illustrating a structure of a control system that performs drive control and periodic fluctuation detection of a CR motor.

As seen in FIG. 2, this carriage drive controller is for driving the CR motor 35, which actuates the carriage 31, in reply to instructions from a CPU 2 that controls the overall printer. The carriage drive controller includes an ASIC (Application Specific Integrated Circuit) 3 and a motor driving circuit (hereafter, referred to as CR driving circuit) 4. The ASIC 3 generates a PWM (Pulse Width Modulation) signal for controlling the rotational velocity and rotational direction of the CR motor 35. The CR driving circuit 4 drives or stops the CR motor 35 based on the PWM signal generated in the ASIC 3.

The ASIC 3 includes a register group 5 that stores various parameters for use in controlling the CR motor 35. The ASIC 3 further comprises a carriage positioner 6, a drive controller 7, a PWM generator 8, etc. The carriage positioner 6 calculates the position and the moving velocity of the carriage 31 according to the encoder signals ENC1 and ENC2 received from the linear encoder 39. The drive controller 7 generates an instruction signal for controlling the CR motor 36 to drive or stop the carriage 31. The PWM generator 8 generates a PWM signal for driving the CR motor 35 at a duty ratio according to the drive instructions from the drive controller 7.

The register group 5 includes: a start setting register 50 that is used to start the CR motor 35; a register 51 that is used to set a target stop position where the carriage 31 should be stopped; a register 52 that is used to set a target driving velocity that is the target velocity when the carriage 31 is moved at a constant velocity; a register 53 that is used to set feedback control (FB control) parameters including various control gains (proportional gain, integral gain, etc.) required for the feedback control of the rotational velocity of the CR motor 35 in the drive controller 7 so that the moving velocity of the carriage 31 is equal to the target driving velocity; and registers 54, 55, and 56, that are used to set corrective manipulated variables required to cancel the periodic velocity fluctuation (hereafter, simply referred to as periodic fluctuation) caused by cogging, etc. of the CR motor 35 when the carriage 31 is moved at a constant velocity. The corrective manipulated variables herein are periodic fluctuation cancellation amplitude (cancellation amplitude), periodic fluctuation cancellation phase angle (cancellation phase angle), and periodic length of the periodic fluctuation (periodic length) to be canceled. The various parameters set in registers 51 to 66 are submitted to the drive controller 7. The drive controller 7 uses the parameters in the respective registers 51 to 56 to drive and control the CR motor 35.

The carriage positioner 6 includes an edge detector 60, a position counter 61, and a velocity calculator 63. The edge detector 60 detects an edge detection signal (e.g., an edge of ENC1 when ENC2 is at a high level) indicating the start/end of each cycle of the encoder signal ENC1 based on the encoder signals ENC1 and ENC2 from the linear encoder 39. The edge detector 60 also detects the rotational direction of the CR motor 35 (e.g., the forward direction if the edge detection signal is a falling edge of ENC1, and the reverse direction if the edge detection signal is a leading edge of ENC1). The position counter 61, according to the rotational direction of the CR motor 35 (i.e., the moving direction of the carriage 31) detected by the edge detector 60, increments (in the case of the forward direction) or decrements (in the case of the reverse direction) the number of the edge detection signal, to detect which slit from the home position the carriage 31 is located. The velocity calculator 63 counts the interval between the edge detection signals from the edge detector 60 by means of the clock signal CK, and calculates the moving velocity of the carriage 31 (i.e., rotational velocity V of the CR motor), based on the count value of the interval and the period of the clock signal CK.

Figure 3:
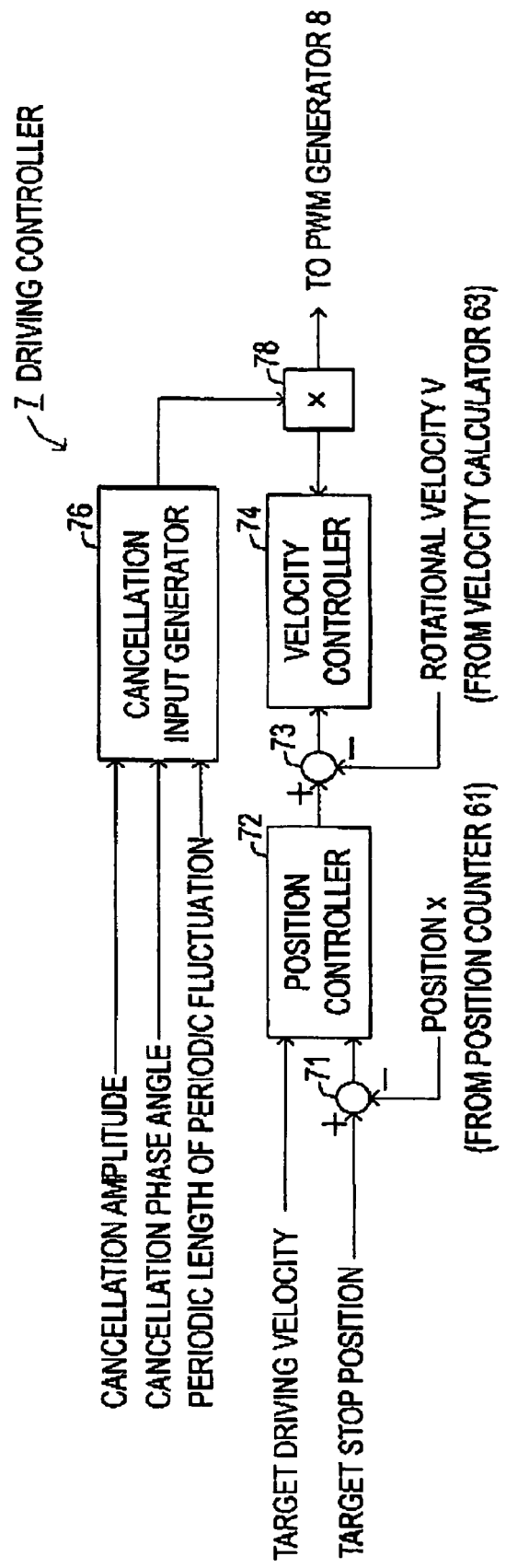
FIG. 3 is a block diagram showing a structure (function) of a drive controller shown in FIG. 2.

As shown in FIG. 3, the drive controller 7 includes a subtracter 71, a position controller 72, a subtracter 73, and a velocity controller 74. The subtracter 71 calculates an error (position error) $\Delta X$ between the target stop position set in the register 51 and the position (actual position) × of the carriage 31 as defined by the count value in the position counter 61. The position controller 72 calculates the target velocity by multiplying the position error $\Delta X$ calculated in the subtracter 71 by the predetermined FB control parameter (position gain) set in the predetermined register 53. The position controller 72 limits the upper limit of the target velocity to the target driving velocity set in the register 52 and the lower limit to the stop target velocity set in the register 54, in order to set the target rotational velocity of the CR motor 35. The subtracter 73 calculates a velocity error $\Delta V$ between the target rotational velocity outputted from the position controller 72 and a rotational velocity V calculated in the velocity calculator 63. The velocity controller 74 calculates a manipulated variable (the driving voltage of the CR motor 35) based on the velocity error $\Delta V$ obtained in the subtracter 73 and a predetermined FB control parameter (velocity control gain) set in the register 53.

The drive controller 7 further includes a multiplier 78 and a cancellation input generator 76. The multiplier 78 multiplies the manipulated variable calculated in the velocity controller 74 by a cancellation input having a phase opposite to the periodic rotational fluctuation caused in the CR motor 35 so as to correct the manipulated variable. The multiplier 78 outputs the manipulated variable after the correction to the PWM generator 8. The cancellation input generator 76 generates the cancellation input to be submitted to the multiplier 78.

The cancellation input generator 76 generates a cancellation input having a feature corresponding to each of the cancellation amplitude, the cancellation phase angle, and the periodic length, set in registers 64 to 56.

Accordingly, if the cancellation amplitude and the cancellation phase angle set in registers 54 and 55 correspond to the amplitude and phase angle of the periodic rotational fluctuation that affects image formation by the recording head 30 among the periodic rotational fluctuations generated when the CR motor 35 is driven at a constant velocity, it is possible to control the periodic rotational fluctuation and avoid uneven color, etc. from appearing on the recording medium.

In the printer of the present embodiment, a corrective manipulated variable setting device 10 is provided that actually drives the CR motor 35 to move the carriage 31, measures the rotational velocity fluctuation of the CR motor 35 generated at the time, detects the amplitude and the phase of the periodic velocity fluctuation to be canceled included in the rotational velocity fluctuation. The setting device 10, based on the detected amplitude and the phase, respectively sets the cancellation amplitude and phase for controlling the periodic velocity fluctuation of the CR motor 35 to be written in registers 54 and 55.

The corrective manipulated variable setting device 10 is described hereafter.

As shown in FIG. 2, the corrective manipulated variable setting device 10 includes a velocity data processor 11, a reference signal generator 12, a multiplier-accumulator 14, a phase selector 15, a phase angle setup unit 16, an amplitude calculator 17, an amplitude setup unit 18, and a data storage unit 20.

Figure 4A:
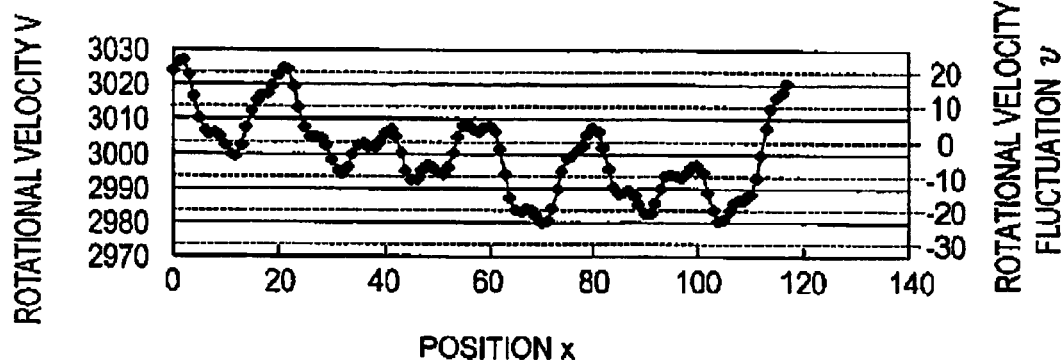
FIGS. 4A, 4B and 4C are explanatory views that describes operation of a corrective manipulated variable setting device shown in FIG. 2.

The velocity data processor 11, as shown in FIG. 4A, samples the rotational velocity V of the CR motor 35 for a sampling period of the periodic length, set in register 56, multiplied by a positive integer n (1, 2, 3, . . . ). The rotational velocity V of the CR motor 35 is calculated in the velocity calculator 63 when the CR motor 35 is driven. The velocity data processor 11 further converts the sampled rotational velocity V into a rotational velocity fluctuation υ, which is the difference from the average velocity during the sampling period (i.e., average velocity=reference velocity (0)). The rotational velocity fluctuation υ is stored in the velocity data storage portion 21 of the data storage unit 20. The sampling operation in the velocity data processor 11 is started from a specific position of the carriage 31 detected by the position counter 61.

Figure 4B:
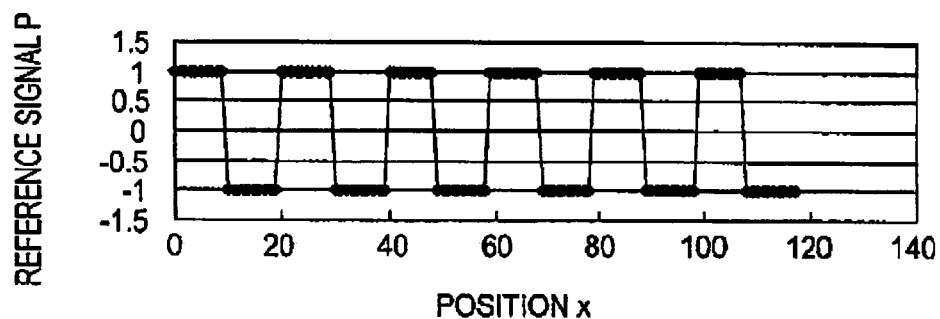

The reference signal generator 12, as shown in FIG. 4B, generates data describing a rectangular wave having the periodic length set in register 56 and a duty ratio of 50% by the same resolution as the linear encoder 39, as a reference signal P, for a sampling period when the velocity data processor 11 samples the rotational velocity V. The reference signal generator 12 stores the data of the generated reference signal P in a reference signal storage portion 22 of the data storage unit 20. The reference signal P is set to be varied around "0". The data value of the reference signal P is equal to "1" at a high level, and "−1" at a low level.

The multiplier-accumulator 14 takes in a data string of the reference signal P stored in the reference signal storage portion 22 and a data string of the rotational velocity fluctuation υ stored in the velocity data storage portion 21, sequentially from the first data, to perform a known multiply-accumulate operation. The result of the calculation is stored in the result storage portion 24 of the data storage unit 20.

The multiplier-accumulator 14, when completing the multiply-accumulate operation based on one reference signal P, encourages the reference signal generator 12 to generate a new reference signal P of which the phase is delayed for one sampling timing from the previously generated reference signal P, and to store a data string of the new reference signal P in the reference signal storage portion 22.

When the data string of the reference signal P stored in the reference signal storage portion 22 is updated in this manner, the multiplier-accumulator 14 performs the multiply-accumulate operation between this data string and the data string of the rotational velocity, fluctuation υ, and stores the result in the result storage portion 24.

The result storage portion 24 is designed to store as many results of the multiply-accumulate operation as the period length set in register 66, that is, as the number of data generated per one period of the reference signal P. The multiplier-accumulator 14 encourages the reference signal generator 12 to generate a reference signal P of which the phase is delayed for one sampling timing one by one until as many results of the multiply-accumulate operation are generated as the number of data. The multiply-accumulate operation is performed on the generated reference signals P.

Figure 4C:
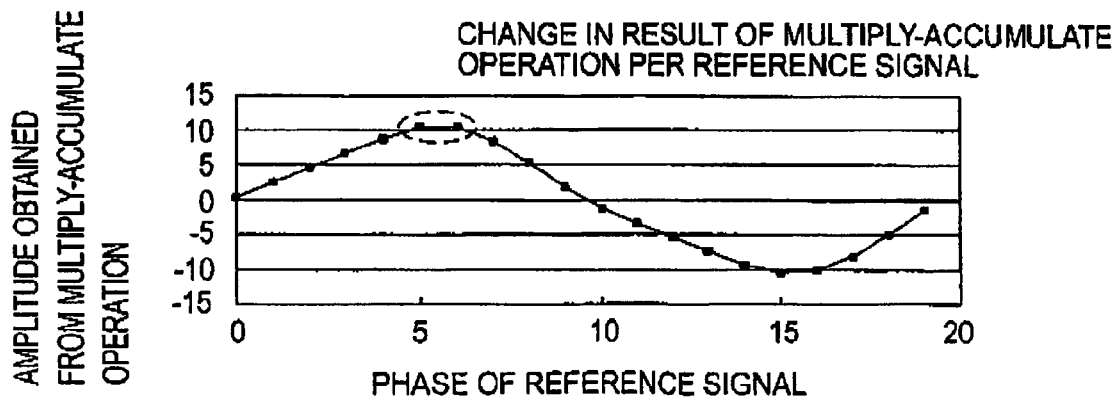

As a result of the above, the results of the multiply-accumulate operation for the respective reference signals P having a phase difference corresponding to the resolution of the linear encoder 39 are stored in the result storage portion 24, as seen in FIG. 4C. In an example shown in FIGS. 4A to 4C, since the fluctuation component having the period corresponding to twenty times of the resolution of the linear encoder 39 is set as the periodic fluctuation to be canceled, twenty reference signals P of which the phases are evenly shifted from one another are generated in the reference signal generator 12, and twenty results of the multiply-accumulate operation are stored in the result storage portion 24.

The closer the phase is of the periodic fluctuation to be canceled included in the rotational velocity fluctuation υ to the phase of the reference signal P, the larger the value of the result of the multiply-accumulate operation is stored in the result storage portion 24. Therefore, the phase selector 15 selects the largest value out of the results of the multiply-accumulate operation stored in the result storage portion 24. The phase of the reference signal P corresponding to the selected value is set as the phase of periodic fluctuation to be canceled.

In the example of FIGS. 4A to 4C, a specific position of the carriage 31 where the velocity data processor 11 has started the sampling of the rotational velocity V is used as a reference when the position x is determined by counting of the position counter 61. Then, a phase that is delayed by "5" or "6" from the phase of the specific position is set as the phase of the periodic fluctuation to be canceled (see FIG. 4C).

When the cancellation input is generated in the cancellation input generator 76 and the manipulated variable is corrected in the driving controller 7, there is a delay in the response of a control system until the cancellation input is actually reflected by the rotation of the CR motor 35. The delay is stored as a phase delay variable in the phase angle setup unit 16. The phase angle setup unit 16 brings forward the phase obtained in the phase selector 16 as much as the stored phase delay variable so as to set the cancellation phase angle to be used for control, and stores the value in register 55.

The amplitude of the periodic fluctuation to be canceled can be obtained by selecting the result of multiply-accumulate operation having the largest absolute value out of those stored in the result storage portion 24, and by dividing the absolute value of the selected result by the "number of data/2" (i.e., "10" in the example of FIGS. 4A to 4C). In FIG. 4C, the vertical axis represents the respective results of the multiply-accumulate operation as amplitude values divided by the "number of data/2".

Accordingly, in the amplitude calculator 17, the result of the multiply-accumulate operation having the largest absolute value is selected out of those stored in the result storage portion 24. The absolute value of the selected result is divided by the "number of data/2" to obtain the amplitude.

The amplitude obtained as above is expressed in units of the velocity fluctuation. Therefore, the opposite phase input (expressed in units of current) to the CR motor 35 is not directly known as is. However, since experimentation has shown that the velocity fluctuation to be canceled is proportional to the cancellation gain (magnification of current) to be submitted to the motor, the proportionality constant can be obtained in advance by an experiment.

The experimentally obtained proportionality constant is stored in advance in the amplitude setup unit 18. The amplitude setup unit 18 multiplies the amplitude of the periodic fluctuation calculated in the amplitude calculator 17 by the proportionality constant to obtain the cancellation amplitude, which is then stored in register 54.

In the present embodiment, the amplitude of the periodic fluctuation is obtained in the amplitude calculator 17 and, by multiplying the amplitude by the proportionality constant, the cancellation amplitude is set by the amplitude setup unit 18. However, if the "number of data/2" is included in the proportionality constant stored in the amplitude setup unit 18, the cancellation amplitude can be obtained directly from the results of the multiply-accumulate operation stored in the result storage portion 24 in the amplitude setup unit 18.

The reason why the amplitude of the periodic fluctuation to be canceled can be obtained by dividing the largest absolute value of the results of the multiply-accumulate operation in the amplitude calculator 17 is as follows.

Firstly, the detected rotational velocity fluctuation υ, the average value of the rotational velocity fluctuation υ, and the generated reference signal are respectively represented as "υ=f(x)", "f", and "y=g(x)". g(x) is a sine wave having an average value of 0, an amplitude of 1, and a specific period m. In f(x) and g(x), the range of the position x is represented as "−L/2≦x≦L/2". The data length L corresponds to an integral multiple of the period m. This condition is represented as "L=Nm" (condition α) using a natural number N.

The Fourier series of f(x) is written in complex form as:

$$f(x) = \sum_{n=-\infty}^{\infty} C_n \exp\left(i\frac{2\pi n}{L}x\right) \quad \text{[Equation 1]}$$

$$C_n = \frac{1}{L}\int_{-\frac{L}{2}}^{\frac{L}{2}} f(t)\exp\left(-i\frac{2\pi n}{L}\right)dt$$

A function g(x−θ), of which the phase is shifted by θ from the function g(x), is expressed in complex number form as $$g(x-\theta) = \exp\left(i\frac{2\pi}{m}(x-\theta)\right) \quad \text{[Equation 2]}$$

Now, a multiple-accumulate operation between the function f(x), from which the average f is subtracted, and the function g(x−θ), i.e., {f(x)−f}·g(x−θ), is performed. If f=C₀, then $$\{f(x)-f\}\cdot g(x-\theta) = \quad \text{[Equation 3]}$$
$$\int_{-\frac{L}{2}}^{\frac{L}{2}}\left\{\sum_{n=1}^{\infty}C_n\exp\left(i\frac{2\pi n}{Nm}x\right) + \sum_{n=1}^{\infty}C_{-n}\exp\left(-i\frac{2\pi n}{L}x\right)\right\}$$
$$\left\{\exp\left(i\frac{2\pi}{m}(x-\theta)\right)\right\}dx$$

When the condition a is applied, then $$= N\int_{-\frac{m}{2}}^{\frac{m}{2}}\left\{\sum_{n=1}^{\infty}C_n\exp\left(i\frac{2\pi n}{Nm}x\right) + \sum_{n=1}^{\infty}C_{-n}\exp\left(-i\frac{2\pi n}{Nm}x\right)\right\} \quad \text{[Equation 4]}$$
$$\left\{\exp\left(i\frac{2\pi}{m}(x-\theta)\right)\right\}dx$$

Due to the orthogonality of complex functions, the term is equal to "0" except for the case in which n=N. Thus, the result of the multiple-accumulate operation is:

$$= N\frac{m}{2}C_N\exp\left(-i\frac{2\pi}{m}\theta\right) = \frac{L}{2}C_N\exp\left(-i\frac{2\pi}{m}\theta\right) \leq \frac{L}{2}C_N \quad \text{[Equation 5]}$$

The results of the multiple-accumulate operation have a maximum value when θ=0, ±m, ±2m, . . . . Thus, the maximum value of the results of the multiple-accumulate operation is the "amplitude of a component having a period m of f(x)·data length/2".

Accordingly, as mentioned above, if the largest absolute value of the results of the multiple-accumulate operation is divided by "number of data/2", the amplitude in a frequency range for the period m can be obtained.

The above description corresponds to the case of the reference signal having a sine wave form. In case of a rectangular wave, the function g(x) is written as:

$$g(x) = \sum_{k=-\infty}^{\infty}\left(-i\frac{4}{m(2k+1)}\right)\exp\left(i\frac{2\pi(2k+1)}{m}x\right) \quad \text{[Equation 6]}$$

The same calculation as above is applied. Then, $$\{f(x)-f\}\cdot g(x-\theta) \leq 4\pi N \sum_{k=-\infty}^{\infty}\frac{1}{2k+1}C_{N(2k+1)} \quad \text{[Equation 7]}$$

The maximum value is "4n·data length L/period m·{amplitude of a component having a period m+⅓ of amplitude of a component having a period m/3+⅕ of amplitude of a component having a period m/5 . . . of f(x)}".

This value includes the amplitudes of the frequency component to be detected and of the frequency components equal to an integer number (odd number) of times the frequency component to be detected. However, the amplitudes of the latter components are small enough to be ignored. Thus, even if the reference signal has a rectangular wave form, the amplitude in the frequency range for the period m can be obtained by dividing the largest absolute value of the results of the multiply-accumulate operation by the "number of data/2", without any problem.

The corrective manipulated variable setting device 10 shown in FIG. 2 is implemented in practice by a microcomputer having a memory as the data storage unit 20. FIG. 2 is a functional block diagram of the corrective manipulated variable setting device 10.

The operation of the corrective manipulated variable setting device 10 is now described by way of a flowchart as process steps of a microcomputer.

Figure 5:
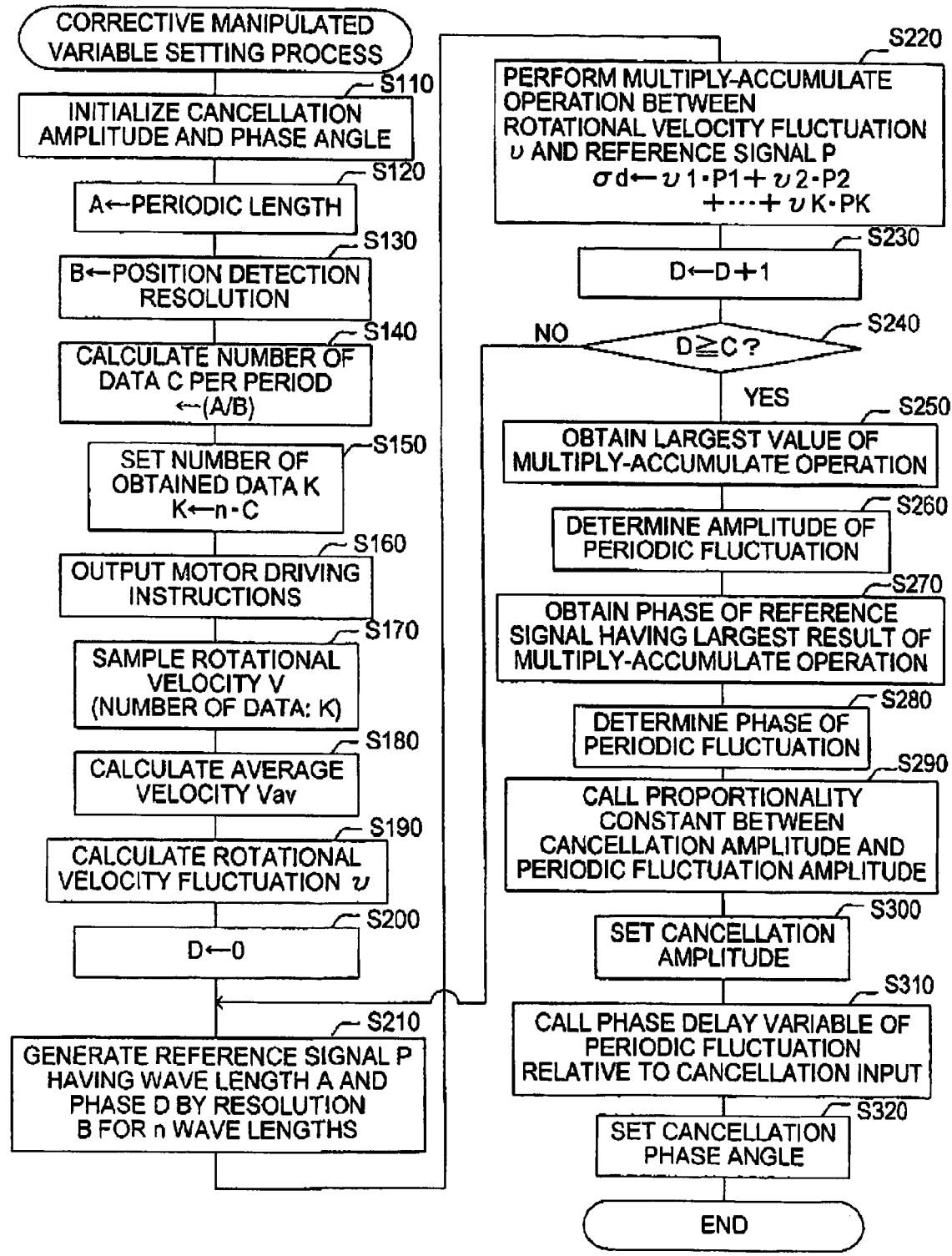
FIG. 5 is a flowchart showing a corrective manipulated variable setting process.

As shown in FIG. 5, when the corrective manipulated variable setting device 10 is started, the cancellation amplitude and phase angle in the respective registers 54 and 55 are initialized to be zero (0) in S110. In S120, the periodic length set in register 56 is read as a value "A".

In S130, the position detection resolution determined from the resolution of the linear encoder 39 is read as a value "B". In S140, the number of data C (=A/B) that can be sampled per one period of periodic fluctuation to be canceled is calculated from the values of "A" and "B".

In S150, magnification n is read which shows for how many periods of the periodic fluctuation the rotational velocity V should be sampled. The number of data C obtained in S140 is multiplied by the magnification n so as to find the number of obtained data K of the rotational velocity V.

In S160, instructions for driving the CR motor as are outputted to the CPU 2 to move the carriage 31 in one direction at a constant velocity. In S170, at predetermined timing in synchronization with the move, the rotational velocity V outputted from the velocity calculator 63 is sampled for the number of data K.

In S180, an average velocity Vav during the sampling is calculated from the rotational velocity V sampled for the number of data K. In S190, a difference from the average velocity Vav is calculated per rotational velocity V sampled for the number of data K to obtain the rotational velocity fluctuation υ.

In S200, an initial value "0" is set as a phase D of the reference signal. In S210, a reference signal P having a wave length A and a phase D is generated for the number of n wave lengths by the resolution B. In S220, a multiply-accumulate operation between the generated reference signal P and the rotational velocity fluctuation υ obtained in S190 is performed (σd←Y1·P1+υ2·P2+... +υK−PK).

In S230, the value of the phase D is incremented. In S240, it is determined whether the value of the phase D has reached the number of data C per one period of the period fluctuation, in order to determine whether the generation of the reference signal P in S210 and the multiply-accumulate operation in S220 have been performed for one period of periodic fluctuation.

If it is determined in S240 that the generation of the reference signal P in S210 and the multiply-accumulate operation in S220 have not been performed for one period of periodic fluctuation, the process moves to S210. In S210, another reference signal P is generated in which the phase is shifted from the phase of the previous reference signal P. In S220, the multiply-accumulate operation between the reference signal and the rotational velocity fluctuation υ is performed.

On the other hand, if it is determined in S240 that the generation of the reference signal P in S210 and the multiply-accumulate operation in S220 have been performed for one period of periodic fluctuation, the process moves to S250. In S250, the result of the multiply-accumulate operation having the largest absolute value is selected from among the results of the multiply-accumulate operation per each reference signal P found in 8220.

In S260, the largest absolute value is divided by the "number of data/2" so as to determine the amplitude of the periodic fluctuation to be canceled. In S270, the phase of the reference signal P is selected of which result of the multiply-accumulate operation is the maximum value. In S280, the phase of the selected reference signal P is determined as the phase of the periodic fluctuation to be canceled.

In S290, the proportionality constant between the predetermined cancellation amplitude and the periodic fluctuation amplitude is read from memory, In S300, the periodic fluctuation amplitude determined in S260 is multiplied by the proportionality constant to obtain the cancellation amplitude. The value of the cancellation amplitude is set in register 54.

In S310, a predetermined phase-delay variable (control-delay variable for the periodic fluctuation against cancellation input) is read from memory. In S320, using the read phase-delay variable, the phase of the periodic fluctuation determined in S280 is corrected (advanced) so as to obtain the cancellation phase angle. The value of the cancellation phase angle is set in register 55. Then, the present process is ended.

As explained above, in the present embodiment, the rotational velocity fluctuation υ of the CR motor 35 is detected. A simple multiply-accumulate operation between the rotational velocity fluctuation υ and the internally generated reference signal P is performed to calculate the intensity of the fluctuation component of the specific period included in the rotational velocity fluctuation υ. Further, the multiply-accumulate operation is repeated with the phase of the reference signal being changed in order to find the phase and amplitude of the fluctuation component of the specific period. Accordingly, the fluctuation component of the specific period of the rotational velocity fluctuation υ generated in the CR motor 35 is accurately identified without performing a complex calculation such as a FFT.

In the present embodiment, based on the phase angle and amplitude as a result of the above identification, the cancellation phase angle and amplitude are set which are the corrective manipulated variables necessary for canceling the periodic rotational fluctuation (periodic fluctuation) generated in the CR motor 35. The cancellation input is determined based on these parameters so as to correct the manipulated variables of the CR motor 35. Accordingly, the periodic rotational fluctuation generated in the CR motor 35 can be favorably controlled.

Also, the periodic velocity fluctuation generated in the CR motor 35 not only includes the component that is synchronized with the rotation of the CR motor 35, but also the fluctuation components generated along with the rotation of the endless belt 37 and pulley 36. According to the present embodiment, by setting the period of the reference signal P to the period corresponding to the fluctuation component, even the periodic fluctuation components that are not synchronized with the rotation of the CR motor 35 can be identified and canceled.

Accordingly, the printer of the present embodiment reduces the rotational fluctuation of the CR motor 35 and the driven targets such as a belt, and allows formation of a favorable image without vertical stripes.

In the above, a preferred embodiment of the present invention is described. However, the present invention is not limited to the above described embodiment, and can be practiced in various manners without departing from the subject matter of the invention.

For instance, in the above embodiment, the cancellation phase angle is set using the phase of the periodic fluctuation to be canceled and the predetermined phase-delay variable. However, the phase-delay variable may be varied in actual use. Thus, the corrective manipulated variable setting process may be executed as shown in FIG. 6, for example.

Figure 6:
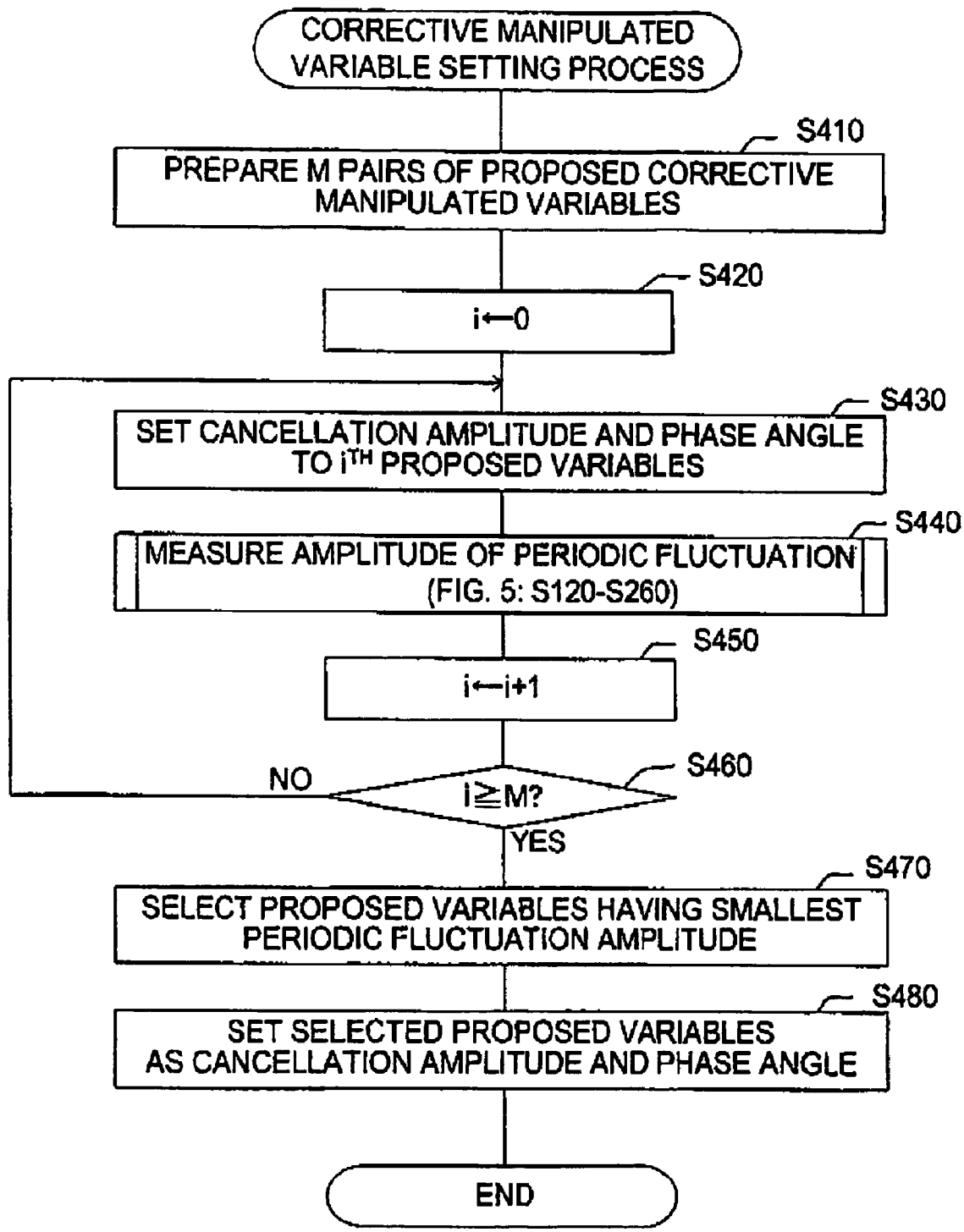
FIG. 6 is a flowchart showing another example of the corrective manipulated variable setting process.

In the process of FIG. 6, M pairs of corrective manipulated variables, in which the cancellation amplitude and the phase angle are set in advance, are stored in a memory. When the corrective manipulated variable setting device 10 is started, the M pairs of corrective manipulated variables are read from the memory in S410. In S420, an initial value of "0" is set to a counter i. In S430, the cancellation amplitude and phase angle that are the i$^{th}$ proposed values are set in registers 54 and 55. In S440, the amplitude of the periodic fluctuation is measured when the CR motor 85 is actually driven using the proposed values. This amplitude measurement is performed in the same manner as in the aforementioned embodiment, by execution of S120 to S260 in FIG. 6.

After the measurement of the amplitude, the counter i is incremented in S450. In S460, it is determined whether the value of the counter i has reached the number M of the proposed corrective manipulated variables provided in S410 (i≧M?).

In S460, if it is determined that the counter i has not reached the number M, the process moves to S430 again since there is still a proposed value not used in the CR motor 35 control. If it is determined that the counter i has reached the number M in S460, the process moves to S470 since the CR motor 35 has been driven using all of the proposed corrective manipulated variables and the amplitudes of the periodic fluctuation at the time have been measured.

In S470, the smallest periodic fluctuation amplitude is selected from the number of M periodic fluctuation amplitudes obtained in S440. The proposed corrective manipulated variables corresponding to the amplitude are selected as the corrective manipulated variables that can most favorably cancel the periodic fluctuation.

Lastly, in S480, the proposed corrective manipulated variables selected in S470 are written to registers 54 and 55 as the cancellation amplitude and phase angle to be used for further control. The process is ended.

In the process shown in FIG. 6, the CR motor 35 is driven while the cancellation inputs are actually generated using a plurality of the proposed corrective manipulated variables. The amplitudes of the periodic fluctuations at the time are measured, and the corrective manipulated variable of which the amplitude is the smallest (i.e., capable of inhibiting the periodic fluctuation of the CR motor 35 most reliably) is selected.

Therefore, according to the actual state of the CR motor 35, the most appropriate corrective manipulated variable can be set. Even if the characteristics of the CR motor 35 and the peripheries are changed from those at the time of design, stable drive of the CR motor 35 can be ensured.

Also, in the above embodiment, a rectangular wave is used as the reference signal. However, a sine wave or a triangular wave can be used, provided that the signal fluctuates periodically.

In the above embodiment, the phase and amplitude of the periodic fluctuation to be canceled are detected in the motor control system. Based on the results of detection, the corrective manipulated variables to determine the cancellation input are set. However, the present invention can be used as an evaluation device that simply evaluates periodic rotational fluctuation of a rotary drive.

In the above embodiment, the present invention is applied to the CR motor 35 in an ink jet printer. However, the present invention can be applied to any rotary drive such as a DC motor. Therefore, the present invention is applicable to a motor other than a CR motor incorporated in an ink jet printer and a laser printer, or to a motor used in a scanner driving system.

What is claimed is:

1. An evaluation device for a rotary drive that evaluates periodic velocity fluctuation of the rotary drive, comprising:
   a rotational velocity fluctuation detector that detects rotational velocity fluctuation relative to a reference velocity of the rotary drive;
   a reference signal generator that generates a reference signal, in which the reference signal has a period and a phase angle; and
   a multiplier-accumulator that performs a multiply-accumulate operation between the rotational velocity fluctuation detected by the rotational velocity fluctuation detector and the reference signal generated by the reference signal generator to calculate a product and then accumulate the product, so as to detect a fluctuation intensity at the phase angle of a component having the period, in which the component is included in the rotational velocity fluctuation detected by the rotational velocity fluctuation detector.

2. The evaluation device for a rotary drive according to claim 1, wherein
   the reference signal generator generates a plurality of reference signals that differ in phase angle from each other, and
   the multiplier-accumulator performs the multiply-accumulate operation between each of the plurality of reference signals generated by the reference signal generator and the rotational velocity fluctuation, so as to detect the fluctuation intensity per phase angle corresponding to each of the reference signals.

3. The evaluation device for rotary drive according to claim 2, further comprising
   a phase angle estimator that estimates a phase angle of the component having the period, in which the component is included in the rotational velocity fluctuation of the rotary drive, based on results of the multiply-accumulate operation obtained per reference signal in the multiplier-accumulator.

4. The evaluation device for a rotary drive according to claim 2, further comprising
   an amplitude estimator that estimates an amplitude of the component having the period, in which the component is included in the rotational velocity fluctuation of the rotary drive, based on the results of the multiply-accumulate operation obtained per reference signal in the multiplier-accumulator.

5. The evaluation device for a rotary drive according to claim 4, wherein
   the amplitude estimator estimates the amplitude of the component having the period, in which the component is included in the rotational velocity fluctuation of the rotary drive, based on a largest absolute value of the results of the multiply-accumulate operation obtained per reference signal in the multiplier-accumulator.

6. The evaluation device for a rotary drive according to claim 4, wherein
   a data length of each of the rotational velocity fluctuation and the reference signal used for the multiply-accumulate operation by the multiplier-accumulator corresponds to an integral multiple of the number of data that the reference signal includes in one period.

7. The evaluation device for a rotary drive according to claim 1, wherein
   the reference signal generator generates a signal of which an average value in one period is equal to zero (0) as the reference signal.

8. The evaluation device for a rotary drive according to claim 7, wherein the reference signal generator generates a sine wave as the reference signal.

9. The evaluation device for a rotary drive according to claim 7, wherein the reference signal generator generates a rectangular wave as the reference signal.

10. A program that allows a computer to be implemented with all the functions of the evaluation device for a rotary drive set forth in claim 1.

11. A corrective manipulated variable setting device that sets a corrective manipulated variable used to control periodic velocity fluctuation of a rotary drive in a control device of the rotary drive, comprising:
    an evaluation device including
       a rotational velocity fluctuation detector that detects rotational velocity fluctuation relative to a reference velocity of the rotary drive;

a reference signal generator that generates a reference signal, in which the reference signal has a period and a phase angle, wherein the reference signal generator generates a plurality of reference signals that differ in phase angle from each other;

a multiplier-accumulator that performs a multiply-accumulate operation between the rotational velocity fluctuation detected by the rotational velocity fluctuation detector and the reference signal generated by the reference signal generator, so as to detect a fluctuation intensity at the phase angle of a component having the period, in which the component is included in the rotational velocity fluctuation detected by the rotational velocity fluctuation detector, and performing the multiply-accumulate operation between each of the plurality of reference signals generated by the reference signal generator and the rotational velocity fluctuation, so as to detect the fluctuation intensity per phase angle corresponding to each of the reference signals; and a phase angle estimator that estimates a phase angle of the component having the period, in which the component is included in the rotational velocity fluctuation of the rotary drive, based on results of the multiply-accumulate operation obtained per reference signal in the multiplier-accumulator; and a corrective manipulated variable setting unit that, based on a phase angle of a component having a specific period, in which the phase angle is estimated by the phase angle estimator inside of the evaluation device, sets a periodic corrective manipulated variable for canceling rotational velocity fluctuation having the phase angle.

12. The corrective manipulated variable setting device according to claim 11, wherein
the corrective manipulated variable setting unit sets a phase angle of the corrective manipulated variable, based on the phase angle of the component having the specific period, in which the phase angle of the component is estimated in the phase angle estimator inside of the evaluation device, and phase delay against the corrective manipulated variable of the rotary drive.

13. A corrective manipulated variable setting device that sets a corrective manipulated variable used to control periodic velocity fluctuation of a rotary drive in a control device of the rotary drive, comprising:
an evaluation device including
a rotational velocity fluctuation detector that detects rotational velocity fluctuation relative to a reference velocity of the rotary drive;
a reference signal generator that generates a reference signal, in which the reference signal has a period and a phase angle, wherein the reference signal generator generates a plurality of reference signals that differ in phase angle from each other;
a multiplier-accumulator that performs a multiply-accumulate operation between the rotational velocity fluctuation detected by the rotational velocity fluctuation detector and the reference signal generated by the reference signal generator, so as to detect a fluctuation intensity at the phase angle of a component having the period, in which the component is included in the rotational velocity fluctuation detected by the rotational velocity fluctuation detector, and performing the multiply-accumulate operation between each of the plurality of reference signals generated by the reference signal generator and the rotational velocity fluctuation, so as to detect the fluctuation intensity per phase angle corresponding to each of the reference signals; and an amplitude estimator that estimates an amplitude of the component having the period, in which the component is included in the rotational velocity fluctuation of the rotary drive, based on the results of the multiply-accumulate operation obtained per reference signal in the multiplier-accumulator; and a corrective manipulated variable setting unit that, based on an amplitude of a component having a specific period, in which the amplitude is estimated by the amplitude estimator inside of the evaluation device, sets a periodic corrective manipulated variable for canceling rotational velocity fluctuation having the amplitude.

14. The corrective manipulated variable setting device according to claim 13, wherein
the corrective manipulated variable setting unit sets an amplitude of the corrective manipulated variable in proportion to the amplitude of the component having the specific period, in which the amplitude of the component is estimated in the amplitude estimator inside of the evaluation device.

15. A corrective manipulated variable setting device that sets a corrective manipulated variable used to control periodic velocity fluctuation of a rotary drive in a control device of the rotary drive, comprising:
a driving unit that corrects a manipulated variable of the rotary drive, using each of a plurality of periodic corrective manipulated variables in which at least one of phase angle and amplitude is different from each other, and sequentially drives the rotary drive using each of a plurality of corrected manipulated variables formed by the correction;
a rotational velocity fluctuation detector that detects rotational velocity fluctuation relative to a reference velocity of the rotary drive every time the driving unit drives the rotary drive using the respective manipulated variables;
a reference signal generator that generates a plurality of reference signals having a predetermined period in which the plurality of the reference signals are different in phase angle from each other;
a multiplier-accumulator that performs multiply-accumulate operation between the rotational velocity fluctuation per each manipulated variable detected in the rotational velocity fluctuation detector and each of the reference signals generated by the reference signal generator, respectively, to calculate a product and then accumulate the product;
an amplitude estimator that, based on results of operation by the multiplier-accumulator, respectively estimates an amplitude of a component having the predetermined period, in which the component is included in the rotational velocity fluctuation generated when the driving unit drives the rotary drive by each manipulated variable; and
a corrective manipulated variable setting unit that sets a corrective manipulated variable, which is used to generate the manipulated variable of the rotary drive and corresponds to a smallest amplitude among the amplitudes estimated by the amplitude estimator, as a corrective manipulated variable suitable for controlling the periodic velocity fluctuation of the rotary drive.

16. The corrective manipulated variable setting device according to claim 15, wherein
the amplitude estimator estimates the amplitude of the component having the predetermined period, in which the component is included in the rotational velocity fluctuation generated when the rotary drive is driven by each manipulated variable, based on a largest absolute value of the results of the multiply-accumulate operation obtained per reference signal in the multiplier-accumulator every time the driving unit drives the rotary drive by each manipulated variable.

17. The corrective manipulated variable setting device according to claim 15, wherein
a data length of each of the rotational velocity fluctuation and the reference signal used for the multiply-accumulate operation by the multiplier-accumulator corresponds to an integral multiple of the number of data that the reference signal includes in one period.

18. The corrective manipulated variable setting device according to claim 15, wherein
the reference signal generator generates signals of which average value in one period is equal to zero (0) as the reference signal.

19. The corrective manipulated variable setting device according to claim 18, wherein
the reference signal generator generates a sine wave as the reference signal.

20. The corrective manipulated variable setting device according to claim 18, wherein the reference signal generator generates a rectangular wave as-the reference signal.

21. A control device for a rotary drive, comprising:
a corrective manipulated variable setting assembly that sets a corrective manipulated variable necessary for controlling periodic velocity fluctuation of a rotary drive, the corrective manipulated variable setting assembly including
an evaluation device including
a rotational velocity fluctuation detector that detects rotational velocity fluctuation relative to a reference velocity of the rotary drive;
a reference signal generator that generates a reference signal, in which the reference signal has a period and a phase angle, wherein the reference signal generator generates a plurality of reference signals that differ in phase angle from each other;
a multiplier-accumulator that performs a multiply-accumulate operation between the rotational velocity fluctuation detected by the rotational velocity fluctuation detector and the reference signal generated by the reference signal generator, so as to detect a fluctuation intensity at the phase angle of a component having the period, in which the component is included in the rotational velocity fluctuation detected by the rotational velocity fluctuation detector, and performing the multiply-accumulate operation between each of the plurality of reference signals generated by the reference signal generator and the rotational velocity fluctuation, so as to detect the fluctuation intensity per phase angle corresponding to each of the reference signals; and
a phase angle estimator that estimates a phase angle of the component having the period, in which the component is included in the rotational velocity fluctuation of the rotary drive, based on results of the multiply-accumulate operation obtained per reference signal in the multiplier-accumulator; and
a corrective manipulated variable setting unit that, based on a phase angle of a component having a specific period, in which the phase angle is estimated by the phase angle estimator inside of the evaluation device, sets a periodic corrective manipulated variable for canceling rotational velocity fluctuation having the phase angle; and
a manipulated variable corrector that corrects a manipulated variable necessary for driving the rotary drive at a target rotational velocity by the corrective manipulated variable set in the corrective manipulated variable setting assembly,
the control device driving the rotary drive according to a corrected manipulated variable formed in the manipulated variable corrector.

22. A control device for a rotary drive, comprising:
a corrective manipulated variable setting assembly that sets a corrective manipulated variable necessary for controlling periodic velocity fluctuation of a rotary drive, the corrective manipulated variable setting assembly including
an evaluation device including
a rotational velocity fluctuation detector that detects rotational velocity fluctuation relative to a reference velocity of the rotary drive;
a reference signal generator that generates a reference signal, in which the reference signal has a period and a phase angle, wherein the reference signal generator generates a plurality of reference signals that differ in phase angle from each other;
a multiplier-accumulator that performs a multiply-accumulate operation between the rotational velocity fluctuation detected by the rotational velocity fluctuation detector and the reference signal generated by the reference signal generator, so as to detect a fluctuation intensity at the phase angle of a component having the period, in which the component is included in the rotational velocity fluctuation detected by the rotational velocity fluctuation detector, and performing the multiply-accumulate operation between each of the plurality of reference signals generated by the reference signal generator and the rotational velocity fluctuation, so as to detect the fluctuation intensity per phase angle corresponding to each of the reference signals; and
an amplitude estimator that estimates an amplitude of the component having the period, in which the component is included in the rotational velocity fluctuation of the rotary drive, based on the results of the multiply-accumulate operation obtained per reference signal in the multiplier-accumulator; and
a corrective manipulated variable setting unit that, based on an amplitude of a component having a specific period, in which the amplitude is estimated by the amplitude estimator inside of the evaluation device, sets a periodic corrective manipulated variable for canceling rotational velocity fluctuation having the amplitude; and
a manipulated variable corrector that corrects a manipulated variable necessary for driving the rotary drive at a target rotational velocity by the corrective manipulated variable set in the corrective manipulated variable setting assembly,
the control device driving the rotary drive according to a corrected manipulated variable formed in the manipulated variable corrector.

23. A control device for a rotary drive, comprising:
a corrective manipulated variable setting assembly that sets a corrective manipulated variable necessary for controlling periodic velocity fluctuation of a rotary drive, the corrective manipulated variable setting assembly including
- a driving unit that corrects a manipulated variable of the rotary drive, using each of a plurality of periodic corrective manipulated variables in which at least one of phase angle and amplitude is different from each other, and sequentially drives the rotary drive using each of a plurality of corrected manipulated variables formed by the correction;
- a rotational velocity fluctuation detector that detects rotational velocity fluctuation relative to a reference velocity of the rotary drive every time the driving unit drives the rotary drive using the respective manipulated variables:
- a reference signal generator that generates a plurality of reference signals having a predetermined period in which the plurality of the reference signals are different in phase angle from each other;
- a multiplier-accumulator that performs multiply-accumulate operation between the rotational velocity fluctuation per each manipulated variable detected in the rotational velocity fluctuation detector and each of the reference signals generated by the reference signal generator, respectively;
- an amplitude estimator that, based on results of operation by the multiplier-accumulator, respectively estimates an amplitude of a component having the predetermined period, in which the component is included in the rotational velocity fluctuation generated when the driving unit drives the rotary drive by each manipulated variable; and
- a corrective manipulated variable setting unit that sets a corrective manipulated variable, which is used to generate the manipulated variable of the rotary drive and corresponds to a smallest amplitude among the amplitudes estimated by the amplitude estimator, as a corrective manipulated variable suitable for controlling the periodic velocity fluctuation of the rotary drive; and
- a manipulated variable corrector that corrects a manipulated variable necessary for driving the rotary drive at a target rotational velocity by the corrective manipulated variable set in the corrective manipulated variable setting assembly,
- the control device driving the rotary drive according to a corrected manipulated variable formed in the manipulated variable corrector.

24. An evaluation method for a rotary drive that evaluates periodic velocity fluctuation of the rotary drive, comprising:
- a rotational velocity fluctuation detection step in which rotational velocity fluctuation relative to a reference velocity of the rotary drive is detected;
- a reference signal generation step in which a reference signal having a period and a phase angle is generated; and
- a multiply-accumulate operation step in which a multiply-accumulate operation is performed between the rotational velocity fluctuation detected in the rotational velocity fluctuation step and the reference signal generated in the reference signal generation step to calculate a product and then accumulate the product, so as to detect a fluctuation intensity at the phase angle of a component having the period, in which the component is included in the rotational velocity fluctuation detected in the rotational velocity fluctuation detection step.

25. The evaluation method for a rotary drive according to claim 24, wherein
- a plurality of reference signals that differ in phase angle from each other are generated in the reference signal generation step, and
- the multiply-accumulate operation is performed between each of the reference signals generated in the reference signal generation step and the rotational velocity fluctuation to detect the fluctuation intensity per phase angle corresponding to each of the reference signals in the multiply-accumulate operation step.

26. The evaluation method for a rotary drive according to claim 25 further comprising:
- a phase angle estimation step in which a phase angle of the component having the period, in which the component is included in the rotational velocity fluctuation of the rotary drive, is estimated based on results of the multiply-accumulate operation obtained per reference signal in the multiply-accumulate operation step.

27. The evaluation method for a rotary drive according to claim 25 further comprising:
- an amplitude estimation step in which an amplitude of the component having the period, in which the component is included in the rotational velocity fluctuation of the rotary drive, is estimated based on results of the multiply-accumulate operation obtained per reference signal in the multiply-accumulate operation step.

28. The evaluation method for a rotary drive according to claim 27, wherein
- the amplitude of the component having the period, in which the component is included in the rotational velocity fluctuation of the rotary drive, is estimated based on a largest absolute value of the results of the multiply-accumulate operation obtained per reference signal in the multiply-accumulate operation step.

29. The evaluation method for a rotary drive according to claim 27, wherein
- a data length of each of the rotational velocity fluctuation and the reference signal used in the multiply-accumulate operation step corresponds to an integral multiple of the number of data that the reference signal includes in one period.

30. The evaluation method for a rotary drive according to claim 24, wherein
- a signal of which an average value in one period is equal to zero (0) is generated as the reference signal in the reference signal generation step.

31. The evaluation method for a rotary drive according to claim 30, wherein
- a sine wave is generated as the reference signal in the reference signal generation step.

32. The evaluation method for a rotary drive according to claim 30, wherein
- a rectangular wave is generated as the reference signal in the reference signal generation step.

33. A corrective manipulated variable setting method that sets a corrective manipulated variable used to control periodic velocity fluctuation of a rotary drive in a control device of the rotary drive, the method comprising:
- a phase angle estimation step in which a phase angle of a component having a specific period, in which the component is included in the periodic velocity fluctuation of the rotary drive, is estimated according to an evaluation method for a rotary drive that evaluates the periodic velocity fluctuation of the rotary drive, the method including a rotational velocity fluctuation detection step in which rotational velocity fluctuation relative to a reference velocity of the rotary drive is detected;

a reference signal generation step in which a reference signal having a period and a phase angle is generated; and a multiply-accumulate operation step in which a multiply-accumulate operation is performed between the rotational velocity fluctuation detected in the rotational velocity fluctuation step and the reference signal generated in the reference signal generation step, so as to detect a fluctuation intensity at the phase angle of a component having the period, in which the component is included in the rotational velocity fluctuation detected in the rotational velocity fluctuation detection step, wherein a plurality of reference signals that differ in phase angle from each other are generated in the reference signal generation step, the multiply-accumulate operation is performed between each of the reference signals generated in the reference signal generation step and the rotational velocity fluctuation to detect the fluctuation intensity per phase angle corresponding to each of the reference signals in the multiply-accumulate operation step; and a phase angle estimation step in which a phase angle of the component having the period, in which the component is included in the rotational velocity fluctuation of the rotary drive, is estimated based on results of the multiply-accumulate operation obtained per reference signal in the multiply-accumulate operation step; and a periodic corrective manipulated variable setting step in which, based on the phase angle of the component having the specific period estimated in the phase angle estimation step, a periodic corrective manipulated variable is set for canceling the rotational velocity fluctuation having the phase angle.

34. The corrective manipulated variable setting method according to claim 33, wherein a phase angle of the corrective manipulated variable is set based on the phase angle of the component having the specific period, in which the phase angle of the component is estimated in the phase angle estimation step and phase delay against the corrective manipulated variable of the rotary drive in the corrective manipulated variable setting step.

35. A corrective manipulated variable setting method that sets a corrective manipulated variable used to control periodic velocity fluctuation of a rotary drive in a control device of the rotary drive, the method comprising:

an amplitude estimation step in which an amplitude of a component having a specific period, in which the component is included in the periodic velocity fluctuation of the rotary drive, is estimated according to an evaluation method for a rotary drive that evaluates the periodic velocity fluctuation of the rotary drive, the method including a rotational velocity fluctuation detection step in which rotational velocity fluctuation relative to a reference velocity of the rotary drive is detected;

a reference signal generation step in which a reference signal having a period and a phase angle is generated; and a multiply-accumulate operation step in which a multiply-accumulate operation is performed between the rotational velocity fluctuation detected in the rotational velocity fluctuation step and the reference signal generated in the reference signal generation step, so as to detect a fluctuation intensity at the phase angle of a component having the period, in which the component is included in the rotational velocity fluctuation detected in the rotational velocity fluctuation detection step, wherein a plurality of reference signals that differ in phase angle from each other are generated in the reference signal generation step, the multiply-accumulate operation is performed between each of the reference signals generated in the reference signal generation step and the rotational velocity fluctuation to detect the fluctuation intensity per phase angle corresponding to each of the reference signals in the multiply-accumulate operation step, and an amplitude estimation step in which an amplitude of the component having the period, in which the component is included in the rotational velocity fluctuation of the rotary drive, is estimated based on results of the multiply-accumulate operation obtained per reference signal in the multiply-accumulate operation step; and a periodic corrective manipulated variable setting step in which, based on the amplitude of the component having the specific period estimated in the amplitude estimation step, a periodic corrective manipulated variable is set for canceling the rotational velocity fluctuation having the amplitude.

36. The corrective manipulated variable setting method according to claim 35, wherein an amplitude of the corrective manipulated variable is set in proportion to the amplitude of the component having the specific period, in which the amplitude of the component is estimated in the amplitude estimation step in the corrective manipulated variable setting step.

37. A corrective manipulated variable setting method that sets a corrective manipulated variable used to control periodic velocity fluctuation of a rotary drive in a control device of the rotary drive, the method comprising:

a driving step in which a manipulated variable of the rotary drive is corrected using each of a plurality of periodic corrective manipulated variables in which at least one of phase angle and amplitude is different from each other, and the rotary drive is sequentially driven using each of a plurality of corrected manipulated variables formed by the correction;

a rotational velocity fluctuation detection step in which the rotational velocity fluctuation relative to a reference velocity of the rotary drive is detected every time the rotary drive is driven by the respective manipulated variables in the driving step;

a reference signal generation step in which a plurality of reference signals having a predetermined period are generated, wherein the plurality of the reference signals are different in phase angle from each other;

a multiply-accumulate operation step in which a multiply-accumulate operation is performed between the rotational velocity fluctuation per each manipulated variable detected in the rotational velocity fluctuation detection step and each of the reference signals generated in the reference signal generation step to calculate a product and then accumulate the product;

an amplitude estimation step in which, based on results of operation in the multiply-accumulate operation step, an amplitude of a component having the predetermined period is respectively estimated, wherein the component is included in the rotational velocity fluctuation generated when the rotary drive is driven by each manipulated variable in the driving step; and a corrective manipulated variable setting step in which a corrective manipulated variable, which is used to generate the manipulated variable of the rotary drive and corresponds to a smallest amplitude estimated in the amplitude estimation step, is set as a corrective manipulated variable suitable for controlling the periodic velocity fluctuation of the rotary drive.

38. The corrective manipulated variable setting method according to claim 37, wherein the amplitude of the component having the predetermined period, in which the component is included in the rotational velocity fluctuation generated when the rotary drive is driven by each manipulated variable, is respectively estimated based on a largest absolute value of the results of the operation obtained per reference signal in the multiply-accumulate operation step every time the rotary drive is driven by each manipulated variable in the driving step.

39. The corrective manipulated variable setting method according to claim 37, wherein a data length of each of the rotational velocity fluctuation and the reference signal used for the multiply-accumulate operation in the multiply-accumulate operation step corresponds to an integral multiple of the number of data that the reference signal includes in one period.

40. The corrective manipulated variable setting method according to claim 37, wherein a signal of which an average value in one period is equal to zero (0) is generated as the reference signal in the reference signal generation step.

41. The corrective manipulated variable setting method according to claim 40, wherein a sine wave is generated as the reference signal in the reference signal generation step.

42. The corrective manipulated variable setting method according to claim 40, wherein a rectangular wave is generated as the reference signal in the reference signal generation step.

43. A control method for a rotary drive comprising:

a corrective manipulated variable setting step in which a corrective manipulated variable necessary for controlling periodic velocity fluctuation of the rotary drive is set; and a manipulated variable correction step in which a manipulated variable necessary for driving the rotary drive at a target rotational velocity is corrected using the corrective manipulated variable set in the corrective manipulated variable setting step, the rotary drive being driven according to the manipulated variable corrected in the manipulated van able correction step, wherein, in the corrective manipulated variable setting step, the corrective manipulated variable is set according to the manipulated variable setting method the method including a phase angle estimation step in which a phase angle of a component having a specific period, in which the component is included in the periodic velocity fluctuation of the rotary drive, is estimated according to an evaluation method for a rotary drive that evaluates the periodic velocity fluctuation of the rotary drive, the method including a rotational velocity fluctuation detection step in which rotational velocity fluctuation relative to a reference velocity of the rotary drive is detected;

a reference signal generation step in which a reference signal having a period and a phase angle is generated; and a multiply-accumulate operation step in which a multiply-accumulate operation is performed between the rotational velocity fluctuation detected in the rotational velocity fluctuation step and the reference signal generated in the reference signal generation step, so as to detect a fluctuation intensity at the phase angle of a component haying the period, in which the component is included in the rotational velocity fluctuation detected in the rotational velocity fluctuation detection step, wherein a plurality of reference signals that differ in phase angle from each other are generated in the reference signal generation step, the multiply-accumulate operation is performed between each of the reference signals generated in the reference signal generation step and the rotational velocity fluctuation to detect the fluctuation intensity per phase angle corresponding to each of the reference signals in the multiply-accumulate operation step, and a phase angle estimation step in which a phase angle of the component having the period, in which the component is included in the rotational velocity fluctuation of the rotary drive, is estimated based on results of the multiply-accumulate operation obtained per reference signal in the multiply-accumulate operation step; and a periodic corrective manipulated variable setting step in which, based on the phase angle of the component having the specific period estimated in the phase angle estimation step, a periodic corrective manipulated variable is set for canceling the rotational velocity fluctuation having the phase angle.

44. A control method for a rotary drive comprising:

a corrective manipulated variable setting step in which a corrective manipulated variable necessary for controlling periodic velocity fluctuation of the rotary drive is set; and a manipulated variable correction step in which the manipulated variable necessary for driving the rotary drive at a target rotational velocity is corrected using the corrective manipulated variable set in the corrective manipulated variable setting step, the rotary drive being driven according to the manipulated variable corrected in the manipulated variable correction step, wherein, in the corrective manipulated variable setting step, the corrective manipulated variable is set according to the manipulated variable setting method including an amplitude estimation step in which an amplitude of a component having a specific period, in which the component is included in the periodic velocity fluctuation of the rotary drive, is estimated according to an evaluation method for a rotary drive that evaluates the periodic velocity fluctuation of the rotary drive, the method including a rotational velocity fluctuation detection step in which rotational velocity fluctuation relative to a reference velocity of the rotary drive is detected;

a reference signal generation step in which a reference signal having a period and a phase angle is generated; and a multiply-accumulate operation step in which a multiply-accumulate operation is performed between the rotational velocity fluctuation detected in the rotational velocity fluctuation step and the reference signal generated in the reference signal generation step, so as to detect a fluctuation intensity at the phase angle of a component having the period, in which the component is included in the rotational velocity fluctuation detected in the rotational velocity fluctuation detection step, wherein a plurality of reference signals that differ in chase angle from each other are generated in the reference signal generation step, the multiply-accumulate operation is performed between each of the reference signals generated in the reference signal generation step and the rotational velocity fluctuation to detect the fluctuation intensity per phase angle corresponding to each of the reference signals in the multiply-accumulate operation step, and an amplitude estimation step in which an amplitude of the component having the period, in which the component is included in the rotational velocity fluctuation of the rotary drive, is estimated based on results of the multiply-accumulate operation obtained per reference signal in the multiply-accumulate operation step; and a periodic corrective manipulated variable setting step in which, based on the amplitude of the component having the specific period estimated in the amplitude estimation step, a periodic corrective manipulated variable is set for canceling the rotational velocity fluctuation having the amplitude.

45. A control method for a rotary drive comprising:

a corrective manipulated variable setting step in which a corrective manipulated variable necessary for controlling periodic velocity fluctuation of the rotary drive is set; and a manipulated variable correction step in which the manipulated variable necessary for driving the rotary drive at a target rotational velocity is corrected using the corrective manipulated variable set in the corrective manipulated variable setting step, the rotary drive being driven according to the manipulated variable corrected in the manipulated variable correction step, wherein, in the corrective manipulated variable setting step, the corrective manipulated variable is set according to the manipulated variable setting method the method including a driving step in which a manipulated variable of the rotary drive is corrected using each of a plurality of periodic corrective manipulated variables in which at least one of phase angle and amplitude is different from each other, and the rotary drive is sequentially driven using each of a plurality of corrected manipulated variables formed by the correction;

a rotational velocity fluctuation detection step in which the rotational velocity fluctuation relative to a reference velocity of the rotary drive is detected every time the rotary drive is driven by the respective manipulated variables in the driving step;

a reference signal generation step in which a plurality of reference signals having a predetermined period are generated, wherein the plurality of the reference signals are different in phase angle from each other;

a multiply-accumulate operation step in which a multiply-accumulate operation is performed between the rotational velocity fluctuation per each manipulated variable detected in the rotational velocity fluctuation detection step and each of the reference signals generated in the reference signal generation step;

an amplitude estimation step in which, based on results of operation in the multiply-accumulate operation step, an amplitude of a component having the predetermined period is respectively estimated, wherein the component is included in the rotational velocity fluctuation generated when the rotary drive is driven by each manipulated variable in the driving step; and a corrective manipulated variable setting step in which a corrective manipulated variable, which is used to generate the manipulated variable of the rotary drive and corresponds to a smallest amplitude estimated in the amplitude estimation step, is set as a corrective manipulated variable suitable for controlling the periodic velocity fluctuation of the rotary drive.

* * * * *